(12) United States Patent
Green

(10) Patent No.: US 7,746,761 B2
(45) Date of Patent: Jun. 29, 2010

(54) TECHNIQUES TO GENERATE CONSTANT ENVELOPE MULTICARRIER TRANSMISSION FOR WIRELESS NETWORKS

(75) Inventor: Marilynn Green, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 227 days.

(21) Appl. No.: 11/923,987

(22) Filed: Oct. 25, 2007

(65) Prior Publication Data
US 2009/0109835 A1 Apr. 30, 2009

(51) Int. Cl.
*H04J 11/00* (2006.01)

(52) U.S. Cl. .............. 370/206; 370/208; 370/210; 370/335; 375/260; 375/295

(58) Field of Classification Search .................. None
See application file for complete search history.

(56) References Cited

U.S. PATENT DOCUMENTS

| 6,715,124 B1 | 3/2004 | Betts ..................... 714/792 |
| 2005/0073949 A1* | 4/2005 | Hayashi .................. 370/208 |
| 2005/0254416 A1* | 11/2005 | Laroia et al. ............. 370/208 |
| 2007/0195740 A1* | 8/2007 | Bhushan et al. ........... 370/335 |

OTHER PUBLICATIONS

Tan, J. "Constant envelop multi-carrier modulation", Proceedings 2002 milcom, 1, (Oct. 2002), 607-611.
Tasadduq, I. A., et al., "OFDM-CPM signals", Electronic letters, 38, (Jan. 2, 2002),80-81.
Fan, P. et al., "Blocked coded modulation for the reduction of the peak to average power ration in OFDM systems.", IEEE trans. consum., electron, 45 (4), (Nov. 1999),1025-1029.
Tellado, J. et al., "Peak power reduction for multicarrier transmission", in proc. Globecom, (1998),219-224.
Wulich, D. et al., "Reduction of peak factor in orthogonal multicarrier modulation by amplitude limiting coding", IEEE Trans. Commun. , 47 (1), (Jan. 1999),18-21.
Muller, S. H., et al., "A novel power reduction scheme for OFDM", in proc. IEEE PIMRC , 3, (1997),1090-1094.
Li, X. et al., "M-sequences for OFDM peak-to-average power ratio reduction and error correction", Electron. Lett., 33 (7), (Mar. 1997),554-555.
Nikookar, H. et al., "Random phase updating algorithm for OFDM transmission with low PAPR", IEEE Trans. Broadcast., 48 (2), (Jun. 2002),123-128.

(Continued)

*Primary Examiner*—Chi H. Pham
*Assistant Examiner*—Shick Hom
(74) *Attorney, Agent, or Firm*—Brake Hughes Bellermann LLP

(57) ABSTRACT

Various example embodiments are disclosed herein. According to an example embodiment, an apparatus for use in a wireless transmitter may include a continuous phase modulation (CPM) sample generator configured to generate a group of constant envelope CPM modulated signal samples, a Fourier transform block configured to perform a Fourier transform on the group of constant envelope signal samples to generate an initial group of Fourier coefficients, a zero insertion block configured to generate an expanded group of Fourier coefficients by inserting one or more zeros in the initial group of Fourier coefficients, and an inverse Fourier transform block configured to perform an inverse Fourier transform on the expanded group of Fourier coefficients to generate a group of constant envelope time-domain samples and to map the constant envelope time-domain samples onto a group of orthogonal subcarriers for transmission.

25 Claims, 8 Drawing Sheets

OTHER PUBLICATIONS

May, T. et al., "Reducing the peak-to-average power ratio in OFDM radio transmission systems, in Proc.", VTC, (1999),2474-2478.

Cimini, L. J., et al., "Peak-to-average power reduction of an OFDM signal using partial transmit sequences, in Proc.", IEEE ICC, (1999),511-515.

Tellado, J. et al., "Efficient algorithms for reducing PAR in multicarrier systems, in proc.", IEEE inf. Theory Symp., (1998),191.

Jiang, T. et al., "Nonlineaar companding transform for reducing peak-to-average power ratio of OFDM signals", IEEE Trans. Broadcast, 50 (3), (Sep. 2004),342-346.

Ren, G. et al., "A complementary clipping transform technique for the reduction of peak-to-average power ratio of OFDM system", IEEE Trans. Consum. Electron., 49 (4), (Nov. 2003),922-926.

Slimane, S. B., "reducing the peak-to-average power ratio of OFDM signals through precoding", IEEE Trans. on vehicular technology, 56 (2), (Mar. 2007),686-695.

Kristensen, Frederik et al., "Flexible baseband transmitter for OFDM", 1. 1. Dep. Of Electroscience and CCCD. Box 118, Lund University. SE-221 00 Lund, Sweden, (Nov. 7, 2003),1-6.

Saltzberg, B. R., "Performance of an Efficient Parallel Data Transmission System", IEEE Transactions on Communication Technology, 15(6), (Dec. 1967),805-811.

Falconer, D. et al., "Frequency Domain Equalization for Single-Carrier Broadband Wireless Systems", IEEE Communications Magazine, (Apr. 2002),1-9.

Chatterjee, S. et al., "Adaptive Modulation based MC-CDMA Systems for 4G Wireless Consumer Applications", IEEE Transactions on Consumer Electronics, 49(4), (Nov. 2003),995-1003.

Peled, A. et al., "Frequency Domain Data Transmission using Reduced Computational Complexity Algorithms", Computer Sciences Department, (1980),964-967.

Moqvist, P. et al., "Trellis Termination in CPM", Electronics Letters, 1940-1941.

Moqvist, P. et al., "Serially Concentrated Continuous Phase Modulation With Iterative Decoding", IEEE Transactions on Communcations, vol. 49, No. 11, (Nov. 2001),1-15.

Huang, Fu-Hua "Thesis: Evaluation of Soft Output Decoding for Turbo Codes", http://scholar.lib.vt.edu/theses/ available/etd-71897-15815/; Virginia Tech, (May 29, 1997).

Hokfelt, Johan et al., "Distance Spectra of Turbo Codes Using Different Trellis Termination Methods", Dept. of Applied Electronics, Lund University Sweden, (2000),1-4.

Guinand, P. et al., "Trellis Termination for Turbo Encoders", Communications Research Centre; Ottawa, Canada, (May 1994),389-392.

Moqvist, P. et al., "Seriall Concatenated Systems: An Iterative Decoding Approach with Application to Continuous Phase Modulation", Department of Computer Engineering, Chalmaers University of Technology; Sweden, (1999),1-69.

Divsalar, D. et al., "Turbo Codes for PCS Applications", Jet Propulsion Laboratory, California Institute of Technology; California, (1996),1-6.

* cited by examiner

TECHNIQUES TO GENERATE CONSTANT ENVELOPE MULTICARRIER TRANSMISSION FOR WIRELESS NETWORKS

TECHNICAL FIELD

This description relates to wireless networks.

BACKGROUND

Orthogonal Frequency Division Multiplexing (OFDM) is a linear modulation scheme in which a set of orthogonal subcarriers are used to carry user data. OFDM can be efficiently implemented using Fourier transforms, such as the Fast Fourier Transform (FFT) and can be designed to be especially robust to multipath. Low complexity frequency domain equalization algorithms can be used to mitigate the impact of the channel. OFDM may provide a spectrally efficient scheme in which the subcarriers can overlap but remain orthogonal (in the absence of synchronization errors).

OFDMA (orthogonal frequency division multiple access) is an extension of OFDM in which multiple users share the same transmission band. OFDMA is a multi-user version of the OFDM modulation scheme. The multiple access feature is achieved in OFDMA by assigning subsets of the subcarriers to individual users, and allows the simultaneous low data rate transmission from several users over the same band. In conventional OFDMA, a different number of the available subcarriers can be assigned to different users, in order to support differentiated quality of service (QoS).

A disadvantage of multi-carrier modulation, such as OFDM or OFDMA, is that it can exhibit high peak-to-average power ratio (PAPR), where the peak value of the signal can be much larger than the average (typical) value. For example, the peak value of an OFDM waveform may typically grow linearly with the number of subcarriers because for some OFDM symbols, all of the subchannel waveforms can potentially add up together in phase at some time during the transmission. This may require the use of circuits with linear characteristics over a large dynamic range, such as linear power amplifiers. However, most power amplifiers may he most power-efficient when they are operating in a saturation (or nonlinear) region. In general, linear power amplifiers are less efficient, more expensive, and often require larger areas (for heat dissipation) than their nonlinear counterparts. Furthermore, clipping the signal at high levels may occur which may distort the information-bearing amplitude of the signal and yields out-of-band radiation, and which may degrade bit error rate (BER) performance of the system.

SUMMARY

According to an example embodiment, a method may include generating, via use of a continuous phase modulator, a group of constant envelope signal samples, performing a Fourier transform on the group of constant envelope signal samples to generate an initial group of Fourier coefficients, generating an expanded group of Fourier coefficients by inserting one or more zeros (e.g., at regular intervals) in the initial group of Fourier coefficients, and performing an inverse Fourier transform on the expanded group of Fourier coefficients to generate a group of constant envelope time-domain samples and to map the constant envelope time-domain samples onto a group of orthogonal subcarriers for transmission.

According to another example embodiment, an apparatus for use in a wireless transmitter may include a continuous phase modulation (CPM) sample generator configured to generate a group of constant envelope CPM modulated signal samples, a Fourier transform block configured to perform a Fourier transform on the group of constant envelope signal samples to generate an initial group of Fourier coefficients, a zero insertion block configured to generate an expanded group of Fourier coefficients by inserting one or more zeros in the initial group of Fourier coefficients, and an inverse Fourier transform block configured to perform an inverse Fourier transform on the expanded group of Fourier coefficients to generate a group of constant envelope time-domain samples and to map the constant envelope time-domain samples onto a group of orthogonal subcarriers for transmission.

According to another example embodiment a method may include generating a group of constant envelope continuous phase modulation (CPM) modulated signal samples, performing a Fourier transform on the group of constant envelope signal samples to generate an initial group of Fourier coefficients, generating an expanded group of Fourier coefficients by inserting one or more zeros in the initial group of Fourier coefficients, performing an inverse Fourier transform on the expanded group of Fourier coefficients to generate a group of constant envelope time-domain samples and to map the constant envelope time-domain samples onto a group of orthogonal subcarriers for transmission.

The details of one or more implementations are set forth in the accompanying drawings and the description below. Other features will be apparent from the description and drawings, and from the claims.

DETAILED DESCRIPTION

Figure 1:
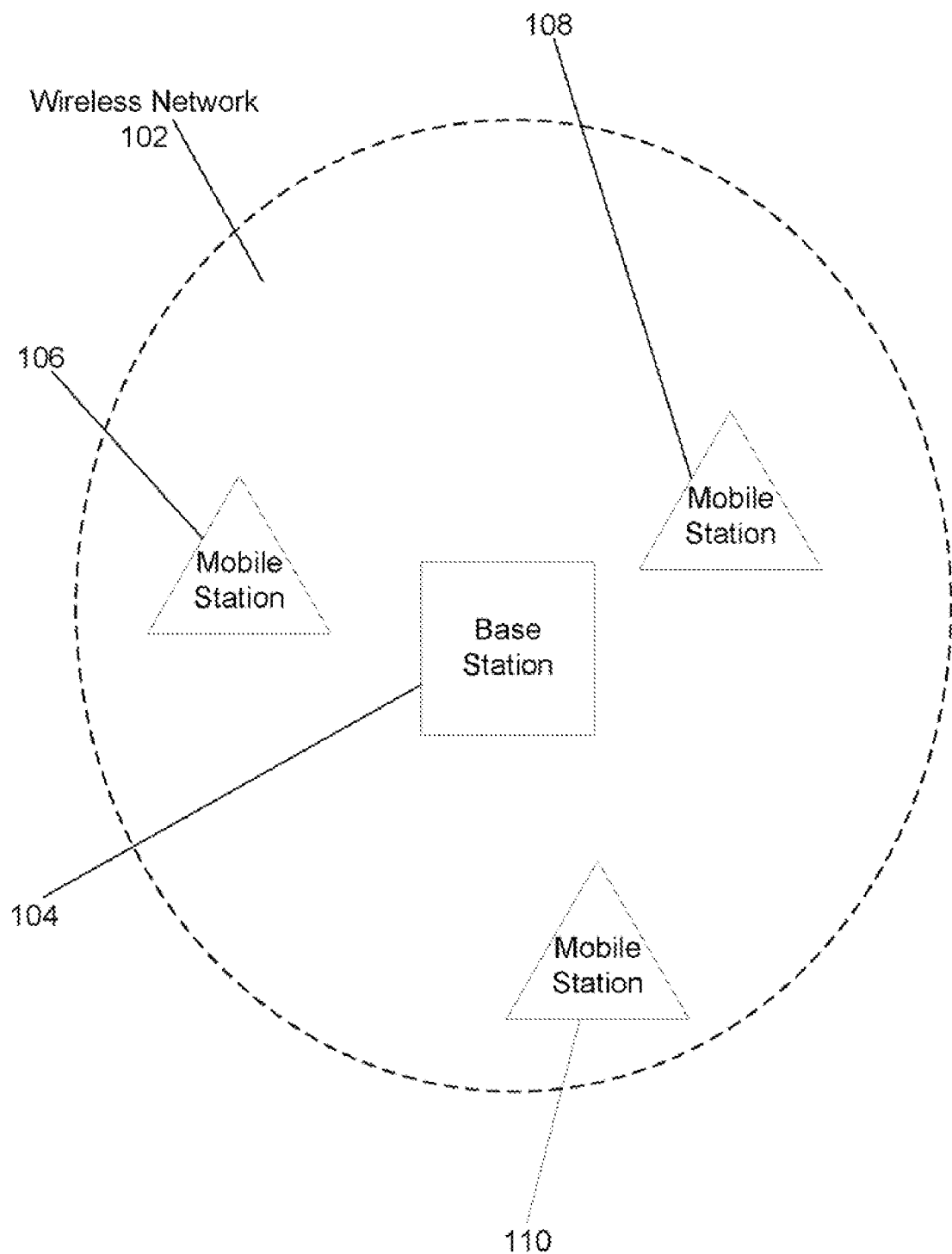
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include any wireless network, such as, for example, an IEEE 802.16 Worldwide Interoperability for Microwave Access (WiMAX) network, an IEEE 802.11 Wireless Local Area Network (WLAN), or a cellular telephone network, a network based on 3GPP (Third Generation Partnership Project), based on LTE (Long Term Evolution), or other wireless network.

The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" may include any type of wireless node, such as base stations, mobile stations, etc. While the present disclosure may use some of the terminology of WiMax or other wireless standards, aspects of the present disclosure may be applicable to any networking or wireless technologies.

Continuous phase modulation (CPM) is a nonlinear modulation scheme in which the information symbols are used to modulate the phase of a complex exponential, for example. CPM may be a power and bandwidth-efficient scheme, and may have several parameters which can be selected to shape the spectrum. An advantage of CPM is that the transmitted signal or waveform output by a CPM modulator typically has a constant envelope, meaning that the peak-to-average power ratio (PAPR) is typically unity or 1 (in linear units), or 0 dB. Thus, with CPM, nonlinear power amplifiers, which are typically more efficient and less expensive than traditional linear amplifiers, may be employed without substantially distorting the information-bearing portion of the transmitted signal or waveform, since the information is carried in the phase of the signal. Thus, CPM may be an attractive candidate for some applications, such as uplink transmissions from wireless mobile devices (e.g., cell phones, WiMAX devices, PDAs and other mobile or wireless devices) where battery life is a key concern.

According to an example embodiment, a wireless transmitter may be provided that may combine the constant envelope property of a CPM modulator with a multicarrier (e.g., OFDM or OFDMA) wireless transmission system (or transmitter) while retaining the orthogonal multicarrier properties and while accommodating multiple users. Some general properties of a CPM system will first be described, followed by some example embodiments in which CPM modulator and a multicarrier (OFDM or OFDMA) transmission scheme are combined in a wireless transmitter.

CPM is typically a single-carrier modulation scheme in which the information symbols are used to modulate the phase of a complex exponential. In an example embodiment, a CPM transmitter, or a CPM modulator, may have several modulation parameters which can be selected in order to shape the spectrum. The CPM waveform may operate or change, as a finite state machine, where the phase output by the CPM for the current (or kth) symbol may be a function of the current (or kth) symbol and L−1 previous symbols, for example.

Over the generic kth symbol interval, the complex envelope of a unit amplitude CPM waveform is given by $$s(t;x) = e^{j\phi(t;x)} \quad (1)$$

$$kT \leq t < (k+1)T$$

where T denotes the symbol duration, $x = \{\ldots x_0, x_1, \ldots\}$ represents the M-ary information sequence $(x_i \in \{\pm 1, \pm 3, \ldots, \pm(M-1)\}$, which modulates the phase term $\phi(t;x)$ as follows—

$$\phi(t;x) = \theta_{k-L} + 2\pi h \sum_{i=0}^{L-1} x_{k-i} q(\tau + iT). \quad (2)$$

The phase shaping function q(t) is defined as the integral of the frequency-shaping pulse, f(t)

$$q(t) = \int_0^t f(\tau) d\tau \quad (3)$$

where f(t) is of duration LT and is normalized such that q(LT)=½. When L=1, the CPM waveform exhibits full response and for L>1, it is partial response. The cumulative phase term $$\theta_{k-L} = \pi h \sum_{i=0}^{k-L} x_i$$

mod2π represents the contribution of all of the past symbols for which the phase shaping function has reached its constant value of ½. Finally, h=K/P is the modulation index (K and P being relatively prime integers).

Using this signal construction, it is clear that for rational h, that the phase evolution of CPM can be represented using a finite state machine, and that over any symbol interval it is completely characterized by the current input symbol, $x_k$, and an L-tuple state vector that is defined as follows—

$$\sigma_k = \{\theta_{k-L}, x_{k-(L-1)}, \ldots, x_{k-1}\}. \quad (3)$$

In conventional CPM, the input symbols are drawn from the M-ary alphabet $\{\pm 1, \pm 3, \ldots, \pm(M-1)\}$ and the corresponding correlative state vector $\{x_{k-(L-1)}, \ldots, x_{k-1}\}$ is drawn from a set of cardinality $M^{L-1}$. The number of possible values of $\theta_{k-L}$ is equal to 2P when Q is odd and P when Q is even. When Q is odd, then $\theta_{k-L}$ can assume P of its values during the kth interval and the other P values during the k+1$^{st}$ interval. Hence, the trellis is generally time-varying, but during any particular symbol interval, the state vector is drawn from a set of cardinality $PM^L$. The application of the Rimoldi's tilted phase decomposition to the signal model is generally used to yield a time-invariant phase space for CPM.

From Equation (1), CPM is a constant envelope scheme:

$$|s(t;x)|^2 = 1. \quad (4)$$

This implies that its PAPR (peak-to-average-power ratio) is typically equal to 0 dB. This is easily shown as, for example, the PAPR is expressed as $$PAPR = \frac{\text{Peak power of } s(t;x)}{\text{Average power of } s(t;x)} = \frac{\max_{0 \leq t \leq KT} |s(t;x)|^2}{\frac{1}{KT} \int_0^{KT} |s(t;x)|^2 dt} \quad (5)$$

Considering the constant envelope characteristic of CPM, it is easily shown that $$PAPR_{CPM} = \frac{1}{1} = 1 \quad (6)$$

$$10\log_{10}(PAPR_{CPM}) = 0 \text{ dB}$$

Hence, for substantially all (or all) M-ary modulations and complexities of the CPM waveform, its PAPR is typically always 0 dB. As noted above, it is this 0 dB PAPR of a CPM waveform that advantageously may allow use of nonlinear amplifiers and circuits, which may be, at least in some cases, more efficient and less expensive than linear amplifiers/circuits.

Figure 2:
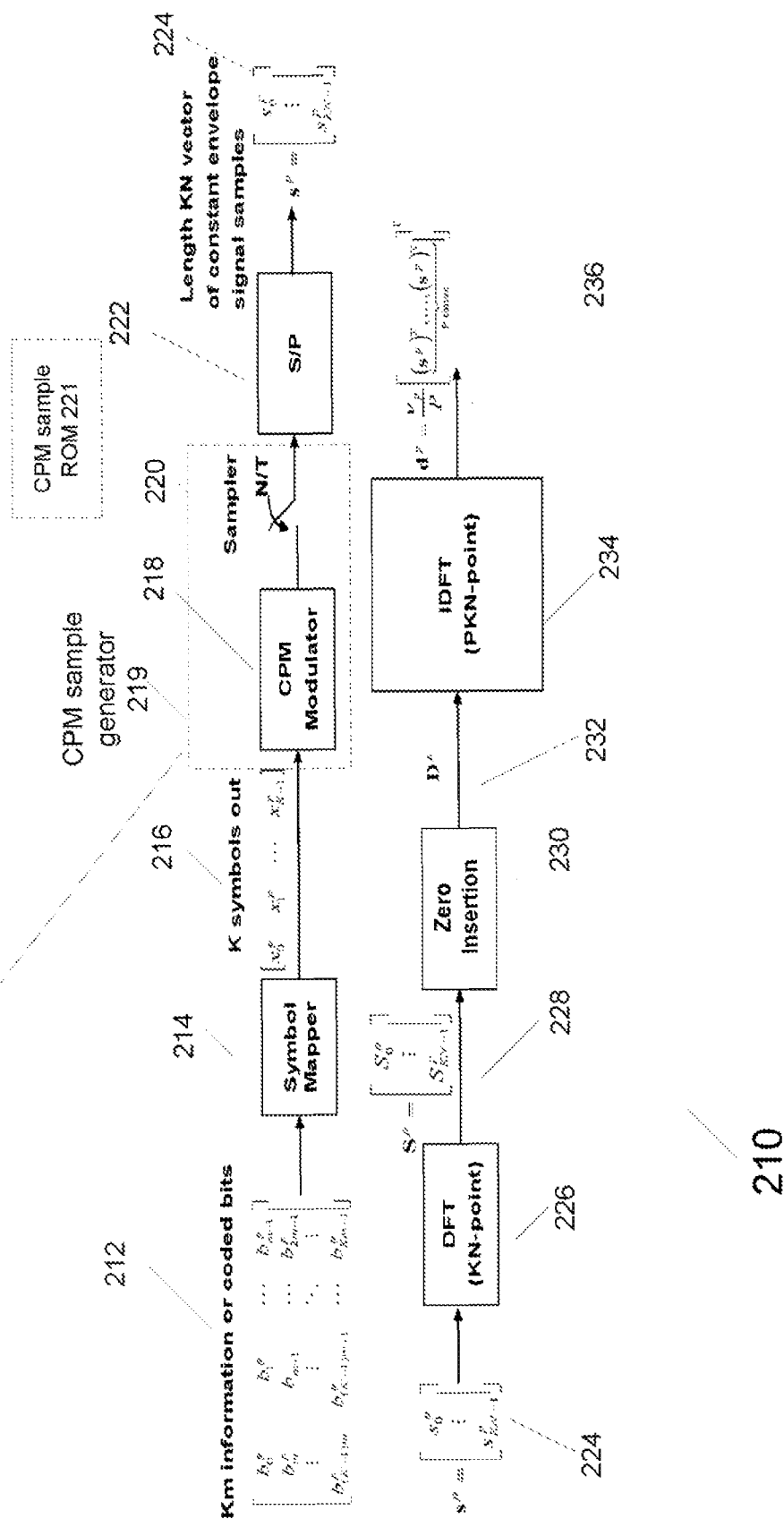
FIG. 2 is a diagram illustrating a portion of a wireless transmitter that combines a CPM modulator and a multicarrier transmission scheme according to an example embodiment.

FIG. 2 is a diagram illustrating a portion of a wireless transmitter that combines a CPM modulator and multicarrier (e.g., OFDM or OFDMA) transmission. FIG. 2 illustrates an exemplary transmission scheme for a scenario in which there are a total of P uplink users, for example. In FIG. 2, the example uplink transmission chain (e.g., performed by a wireless transmitter for uplink data transmission) is described for the pth such subscriber, where the pth subscriber is one of the P uplink subscribers, which may be described as $p \in [0, P-1]$. The pth user is assigned to send data using, for example, an M-ary CPM modulation scheme, whereby $M=2^m$ and m denotes the number of bits per symbol.

Transmitter 210 may receive a group of Km information bits 212 to be transmitted, which may be coded bits. The information bits 212 are mapped by symbol mapper 214 to K symbols 216, $\lfloor x_0^P x_1^P x_{K-1}^P \rfloor$ which are input to a continuous phase modulation (CPM) sample generator 219 to generate a group of constant envelope CPM modulated signal samples. CPM generator may include, e.g., either 1) a CPM modulator 218 and may also include a sampler 220; or 2) a CPM sample ROM 221.

CPM modulator 218 performs Continuous Phase Modulation (CPM) on the received symbols to generate a constant envelope signal. The output of CPM modulator 218 may be discrete samples or, for example, may be a continuous or analog signal, which may then be sampled by sampler 220 to generate the CPM samples. Alternatively, CPM sample generator 219 may include, for example, a CPM sample ROM 221 (read only memory) that may store a lookup table and may store CPM signal samples, and may output one of a plurality of the CPM signal samples. These stored CPM signal samples may be discrete sample values that have been pre-calculated and stored in memory, e.g., pre-calculated based on a sampled CPM signal.

The CPM signal or waveform (or output from CPM sample generator 219) may operate or change, as a finite state machine, where the phase output by the CPM modulator 218 (or output of CPM sample ROM 221) for the current (or kth) symbol may be a function of the current (or kth) symbol and the L−1 previous symbols, for example. In an example embodiment, the constant envelope signal output from CPM modulator 218 may be a continuous time signal. Thus, the output of the CPM modulator may be sampled by a sampler 220 at rate N/T (i.e., N samples per symbol interval, T) and the output of this sampling operation may be converted, via serial to parallel circuit 222, to a vector (of length KN) of constant envelope samples $S^p$ 224.

A Fourier Transform is then performed on the constant envelope samples $S^p$ 224 to transform the constant envelope samples $S^p$ 224 to the frequency domain. For example, the constant envelope samples 224 may then be input to a Discrete Fourier Transform (DFT) 226. The DFT is performed on the elements of $S^p$ to yield the length KN vector of DFT (or Fourier) coefficients $S^p$ 228 through the operation shown in equation (9), for example. These Fourier coefficients 228 correspond to the vector (or group) of constant envelope signal samples provided by CPM modulator 218 (e.g., output from sampler 220).

$$S_k^p = \sum_{n=0}^{KN-1} s_n^p e^{-j2\pi kn/KN}; k = 0, \ldots, KN-1 \quad (7)$$

The DFT vector (or initial set of Fourier coefficients) $S^p$ 228 is then expanded by inserting one or more zeros (zero insertion 230), e.g., at regular intervals, such as before (or between) each of (or one or more of) the Fourier coefficients 228, to generate an expanded group of Fourier coefficients $D^p$ 232. In an example embodiment, this zero insertion 230 may include (1) inserting P−1 zeros between consecutive coefficients (or samples), (2) a total of p zeros before the first coefficient and (3) a total of P−1−p zeros after the last coefficient (e.g., where P is the number of users or maximum number of users sharing the multicarrier spectrum, and where p identifies the user for this wireless transmitter) and p=0, . . . ,P−1.

According to an example embodiment, the expansion of the Fourier coefficients 228 by insertion of zeros may operate to (for example): 1) accommodate multiple users in a wireless system (e.g., OFDMA) by inserting zeros for Fourier coefficients associated with subcarriers that are used by or assigned to (or available to be assigned to) other users; the zeros may be inserted to accommodate other users for the OFDMA or multiuser system (e.g., these inserted zeros may result in non-transmission over such subcarrier(s) or resources by the current user, allowing other users to transmit using these subcarriers or resources); For example, for user 0 of 4 total users (p=0, P=4), zeros would not be inserted before the first Fourier coefficient of DFT vector (or Fourier coefficients) $S^p$ 228 (since this is for user 0 or the first of the 4 users), but 3 zeros would be inserted before second Fourier coefficient, 3 zeros inserted before the third Fourier coefficient, . . . and 3 zeros inserted after the last Fourier coefficient, for example. 2) typically expands the bandwidth of the signal; and 3) assists in preserving the constant envelope characteristic the original signal samples 224 on the transmitter output signal of the corresponding (time-domain) OFDMA samples that are output by IDFT 234 (described in greater detail below). Thus, the zero insertion 230 allows, or at least assists or may ensure, that the output signal 236 will have a constant envelope if the input signal 224 is a constant envelope signal (in this example, signal samples 224 will have a constant envelope due to the CPM modulator 218).

The zero insertion 230 may be illustrated with the following additional example case in which P=4 (there are four subscribers or users), and KN=4 (for example) The expanded DFT group of Fourier coefficients $D^p$ 232 for each of the four users are as shown in Equation (10) in matrix form. The pth column of the matrix $D^p$ or $\tilde{S}$ (p=0, 1, 2, 3) represents the expanded DFT coefficient vector for the pth user while each row represents a different sub-carrier assignment. For example, the first column represents the expanded coefficient vector $D^p$ 232 for user 0 (p=0), showing 3 zeros inserted after each of its Fourier coefficients $S_0^0, S_1^0, S_2^0, S_3^0$. The zeros are inserted, e.g., to accommodate the other users in a multiuser system or OFDMA transmission, e.g., to reserve subcarriers or resources for the other users (for users p=1, p=2 and for p=3), and may also preserve the constant envelope quality on the output signals 236. Because there is no overlap in the sub-carrier assignment, the user's uplink transmissions are orthogonal and permit multiple access of the CPM transmission scheme within an OFDMA context. Each user may transmit on its assigned subcarriers, and may be idle (or not transmitting) on other user's subcarriers, e.g., due to inserted zeros. Also, the transmitter's zero insertion 230 to generate the expanded DFT coefficients 232 may typically allow one or more properties of the input signal 224 (e.g., the constant envelope property of signal samples 224) to be preserved or reflected in the OFDMA signal samples 236 output from IDFT 234.

$$\tilde{S} = \begin{bmatrix} S_0^0 & 0 & 0 & 0 \\ 0 & S_0^1 & 0 & 0 \\ 0 & 0 & S_0^2 & 0 \\ 0 & 0 & 0 & S_0^3 \\ S_1^0 & 0 & 0 & 0 \\ 0 & S_1^1 & 0 & 0 \\ 0 & 0 & S_1^2 & 0 \\ 0 & 0 & 0 & S_1^3 \\ S_2^0 & 0 & 0 & 0 \\ 0 & S_2^1 & 0 & 0 \\ 0 & 0 & S_2^2 & 0 \\ 0 & 0 & 0 & S_2^3 \\ S_3^0 & 0 & 0 & 0 \\ 0 & S_3^1 & 0 & 0 \\ 0 & 0 & S_3^2 & 0 \\ 0 & 0 & 0 & S_3^3 \end{bmatrix} \quad (8)$$

Returning to FIG. 2, the pth user performs the IDFT (Inverse Discrete Fourier Transform) by IDFT 234 of to yield the length—PNK vector of IDFT time samples $d^p$ 236. IDFT 234 operates to modulate or map the time samples 236 onto OFDMA subcarriers for transmission. In this figure, the coefficient $v_p$ is a constant which accounts for the initial p zeros in the up-sampled DFT coefficient vector since this linear shift in the frequency domain introduces a constant phase shift in the output of the IDFT.

In this example embodiment, the insertion of zeros by zero insertion 230 in the frequency domain causes scaling and repetition in the time domain of signal samples 224 for time samples $d^p$ 236 output from IDFT 234. Thus, by inserting zeros in the frequency domain by zero insertion 230, the constant envelope signal samples 224 $S^p$ are repeated P times and scaled by 1/P at the output of IDFT 234. Thus, as shown in FIG, 2, the time samples $d^p$ 236 includes the signal samples $S^p$ repeated P times, and scaled by $V^p/P$, Although P copies of the signal samples $S^p$ are output, only one copy of signal samples $S^p$ may necessarily be mapped onto OFDMA subcarriers and transmitted, according to an example embodiment. Thus, the output signal 236 may include both constant envelope and provided on multiple subcarriers (e.g., transmitted on multiple OFDMA subcarriers).

Also, in one example embodiment, by providing the CPM modulation 218 before the IDFT functions (or, before DFT 226, zero insertion 230 and IDFT 234) to map samples onto specific OFDMA subcarriers, the multicarrier (and orthogonal) quality of the output signals may be preserved (while also providing a constant envelope signal samples at the output. Whereas, performing CPM after OFDMA mapping may, at least in some cases, convert the signal to a single carrier signal, thus losing the advantages of OFDMA or multiple carriers.

In an example embodiment, the output of the IDFT 234 contains a set of scaled replicas of the original input waveform 224 for each user, which is mapped onto a set of OFDMA subcarriers. Hence, the output of the IDFT 234, which is an OFDMA signal, is still constant envelope and still has a 0 dB PAPR regardless of the size of the IDFT and regardless of the modulation level. This is not true for conventional OFDM/OFDMA, in which the PAPR depends, at the very least, on the modulation scheme (e.g., 8-PSK, 16-QAM, 256-QAM) and the number of sub-carriers.

EXAMPLE 1

Figure 3:
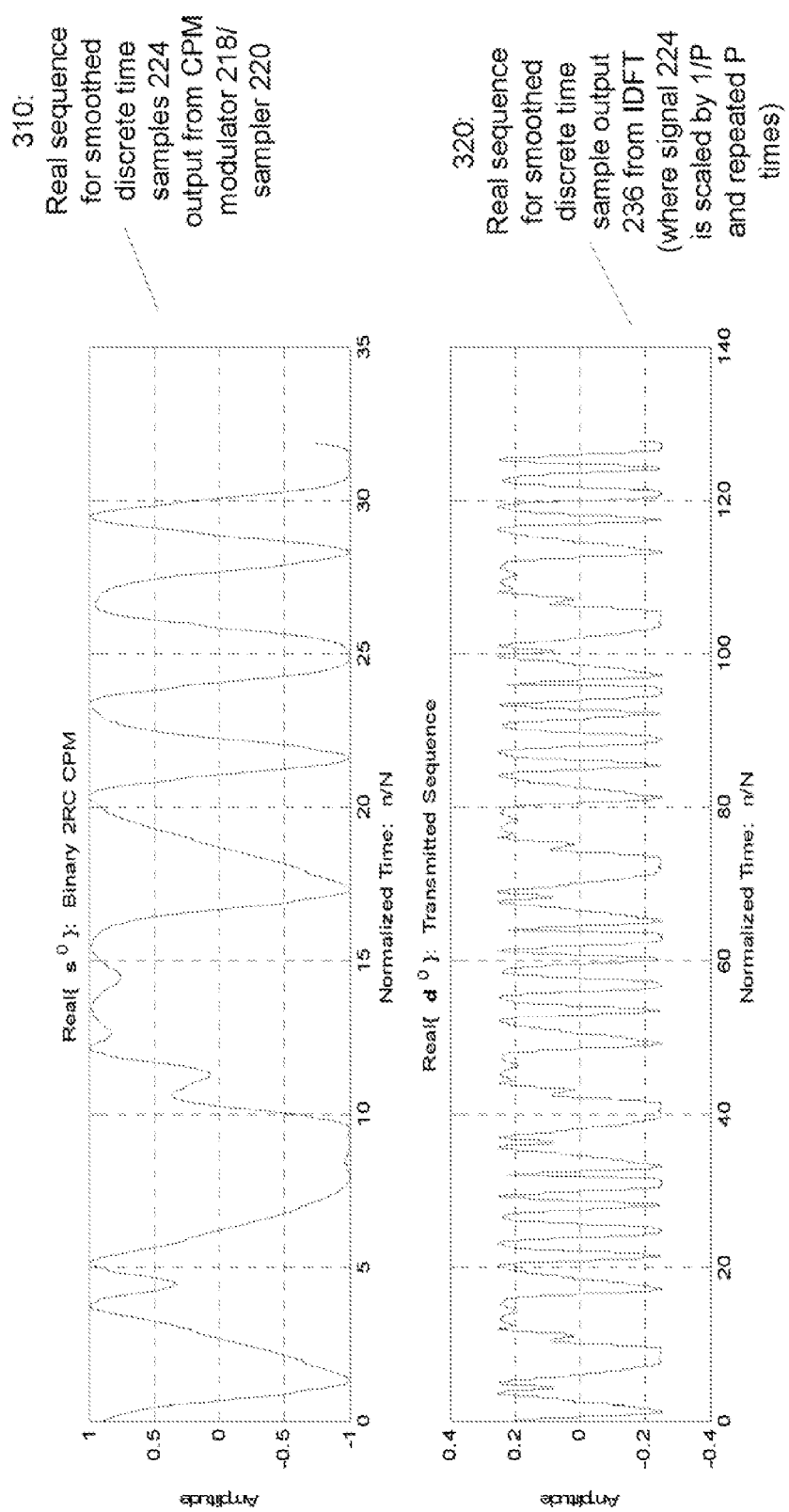
FIG. 3 is a diagram illustrating the real part of the input waveform from a CPM modulator, and the real part of the output waveform according to an example embodiment.

In this example, the subscriber generates a binary CPM waveform (m=1, $M=2^m=2$) with parameters h=1/7, N=16, K=32, Hence NK=512. Assuming that there are four subscribers (P=4), the IDFT size is 2048. FIG. 3 is a diagram that shows the real sequence 310 for smoothed discrete time samples (signal samples) 224 output from CPM modulator 218/sampler 220, and the real sequence for smoothed discrete time sample output 236 from IDFT 234 (where signal 224 is scaled by 1/P and repeated P times), for p=0 (user 0), and P=4. As shown, the signal 320 is scaled by ¼ (1/P), as compared to signal 310, and is repeated four times.

Figure 4:
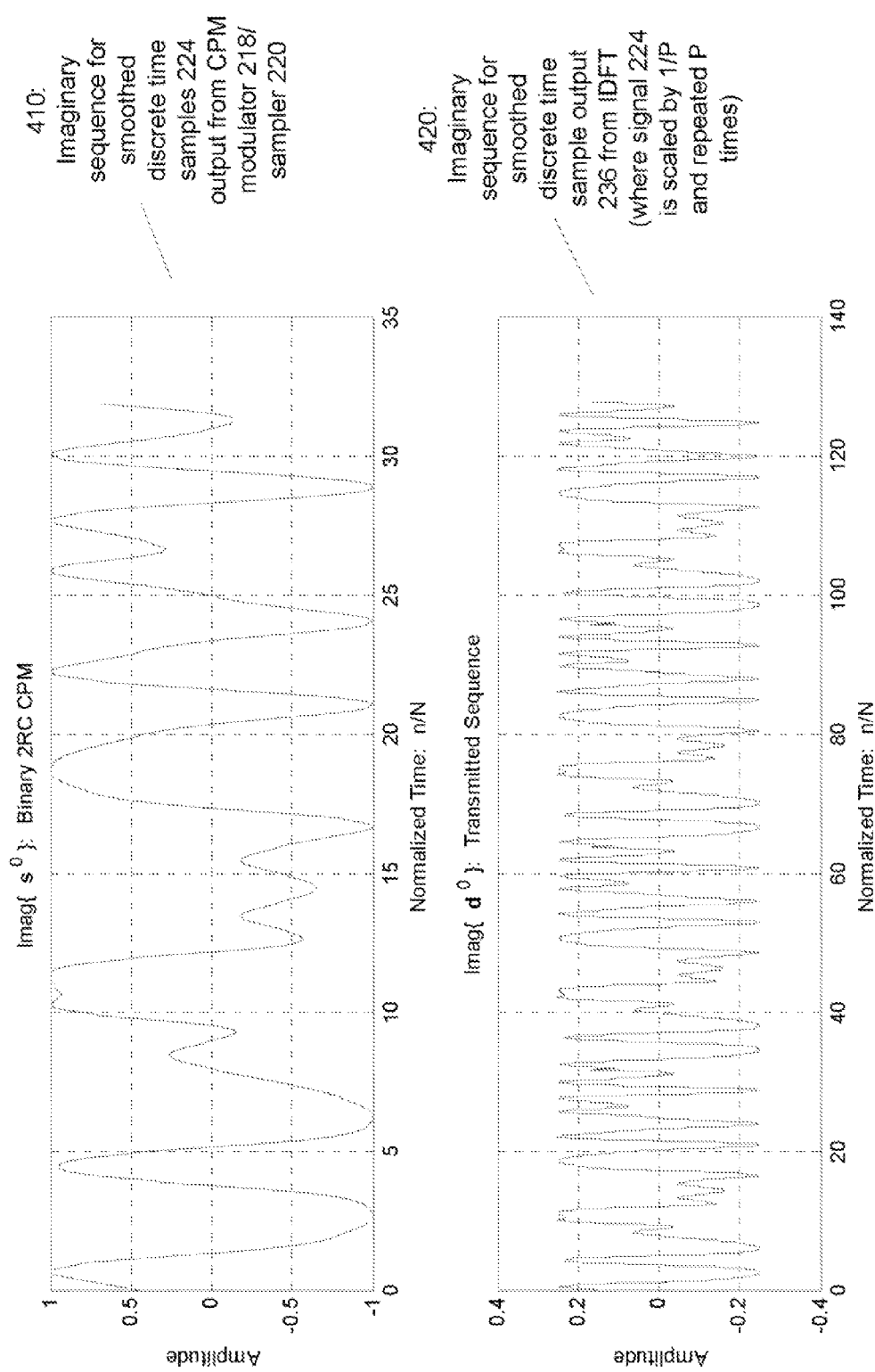
FIG. 4 is a diagram illustrating the imaginary part of the input waveform from a CPM modulator, and the imaginary part of the output waveform according to an example embodiment.

FIG 4 is a diagram that shows the corresponding imaginary sequence 410 for smoothed discrete time samples (signal samples) 224 output from CPM modulator 218/sampler 220, and the imaginary sequence 420 for smoothed discrete time sample output 236 from IDFT 234 (where signal 224 is scaled by 1/P and repeated P times), for p=0 (user 0), and P=4. Similarly, signal 420 is scaled by ¼ (1/P), as compared to signal 410, and is repeated four times. (Scaling factor is 1/P or ¼, since there are 4 users in this example). In FIGS. 3 and 4, the signals 310, 320, 410 and 420 are smoothed by connecting the amplitudes of the discrete samples, to illustrate what a continuous waveform may look like based upon these discrete samples.

Figure 5:
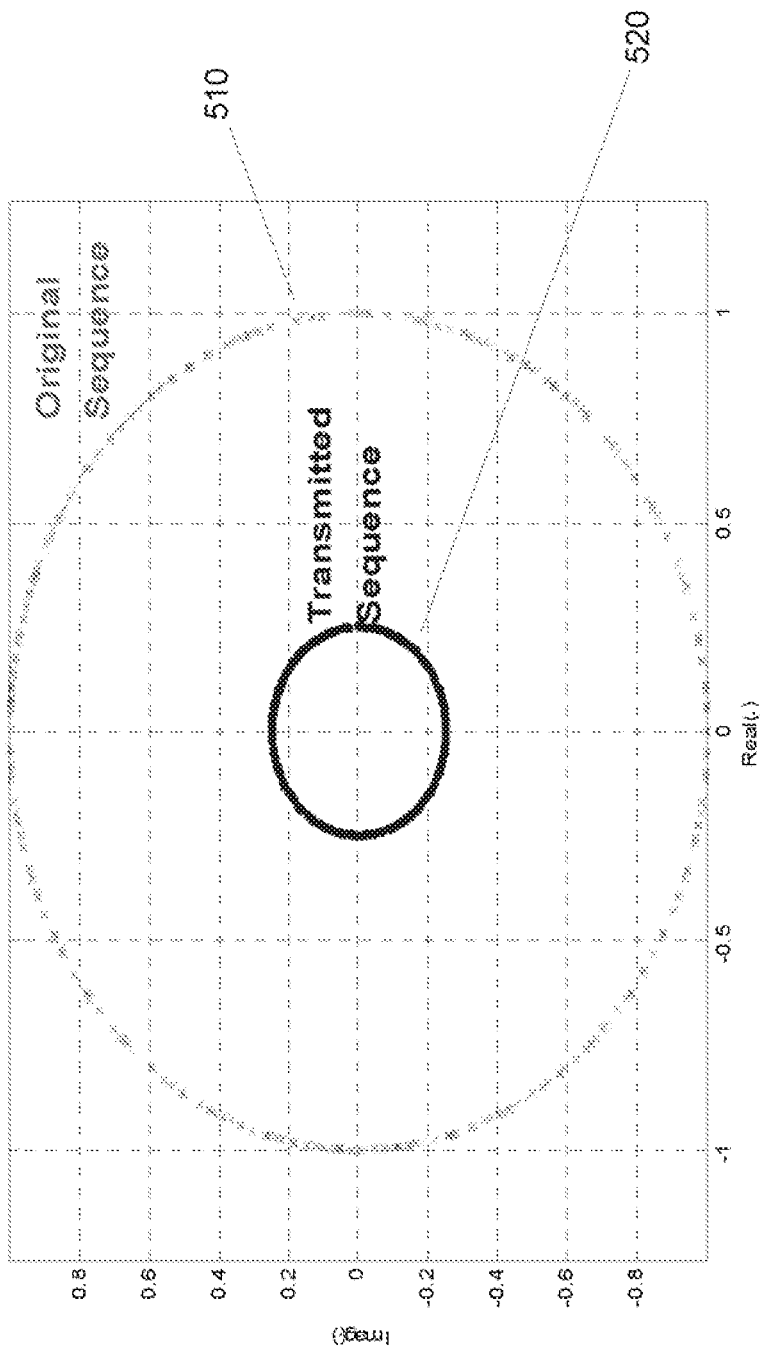
FIG. 5 is a diagram that shows the corresponding imaginary sequence 510 for smoothed discrete time samples output by a CPM modulator.

FIG. 5 is a diagram that is a plot of the imaginary parts of the respective waveforms shown in FIG. 4 versus the real part of the output sequences shown in FIG. 3. When a signal has constant envelope, it lies on a circle, as shown in FIG. 5. FIG. 5 illustrates that the original signal 510 (representing discrete time samples 224) and transmitted signal 520 (representing discrete time samples 236 output from IDFT) both lie on a circle (note that the original signal 510 lies on the unit circle (radius=1) and the transmitted signal 520 lies on a circle with radio 1/P. This implies that both signals have a constant envelope and that the PAPR of the signal 520 to be transmitted over the channel is still 0 dB.

Figure 6:
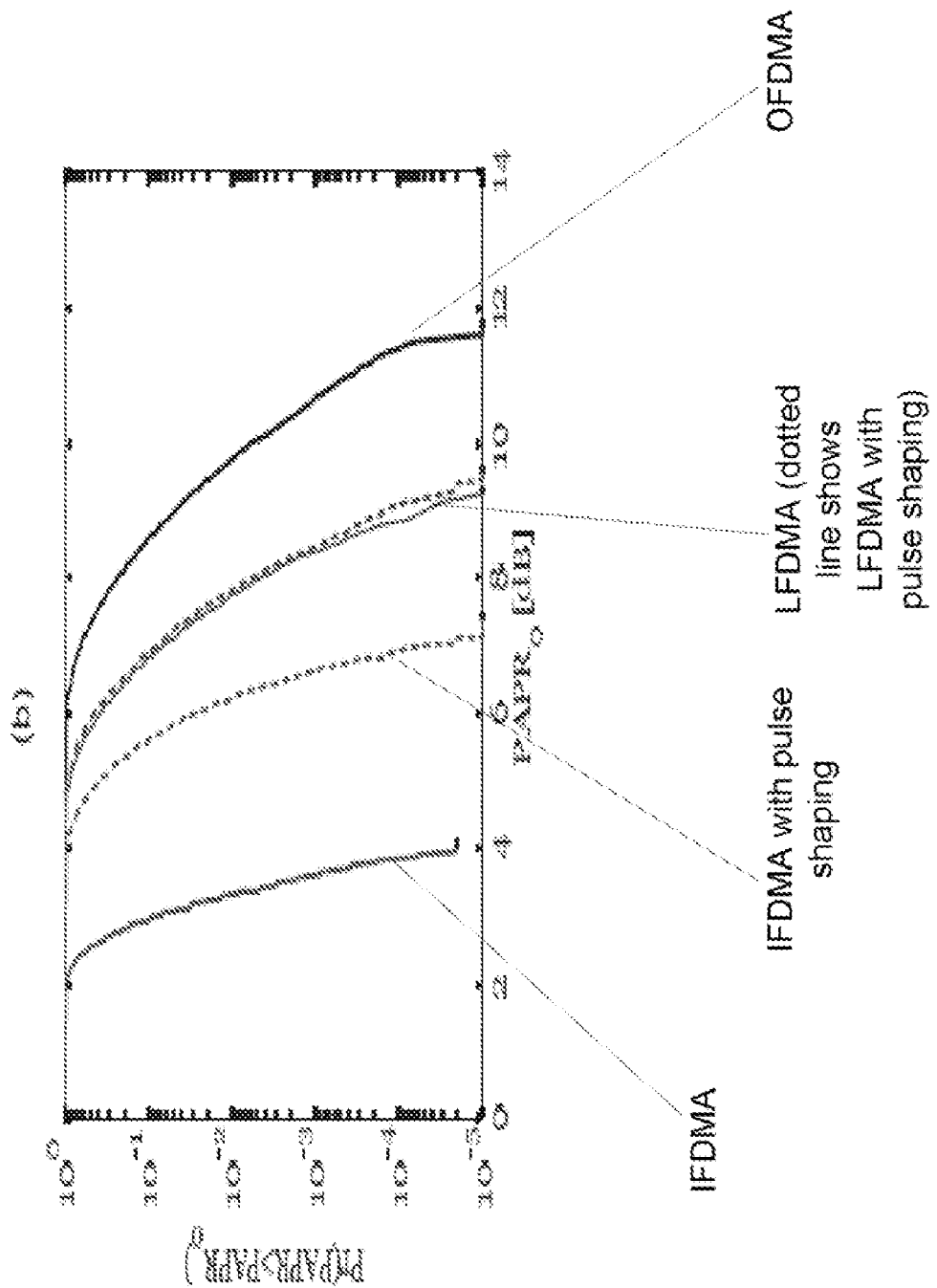
FIG. 6 is a diagram illustrating the complementary cumulative distribution function (CCDF) of the PAPR for two sub-carrier mapping schemes.

FIG. 6 is a diagram illustrating the complementary cumulative distribution function (CCDF) of the PAPR for two sub-carrier mapping schemes (IFDMA and LFDMA) for a system that uses 256 subcarriers with 64 subcarriers per user, for example. LFDMA is a localized sub-carrier assignment in which consecutive bins of the IDFT are assigned to a single user. FIG. 6 illustrates the CCDF of PAPR for a 16-QAM (linear) transmission scheme. 16-QAM encodes m=4 bits per symbol. The CCDF of the PAPR for the IFDMA scheme without pulse shaping may be compared to the CPM/OFDMA techniques described herein for the case in which m=4 (16-CPM). The PAPR for IFDMA lies between 2 and 4 dB for 16-QAM. Thus, with such a PAPR, a wireless node or transmitter may be required to use linear amplifiers and other circuits to avoid significant distortion. The typical non-zero PAPR for a linear modulation scheme may be compared with the 0 dB PAPR of the output or transmitted signal (e.g., signal 236, FIG. 2, output by IDFT block 234 for transmission on subcarriers). Furthermore, for a given modulation level (M or m), the CPM parameters (h, L) can be selected to optimize BER performance of the system while linear modulation schemes, such as 16-QAM, typically do not have similar degrees of freedom.

In this section, some further details of signal generation are described.

A frame size of Q=KN signal samples may be used for example, where K denotes the number of symbols observed over a frame duration of KT seconds and N denotes the number of samples per symbol interval, T. Hence, the signal sample rate is N/T seconds. The integer N can be regarded as a type of spreading factor.

Over the generic kth symbol interval, the continuous-time CPM waveform associated with the pth user may be expressed as $$s_k^p(t;x) = \exp(j\theta_{k-L}^p)\exp\left(j2\pi h\sum_{i=0}^{L-1} x_{k-i}^p q(t-(k-i)T)\right) \quad (9)$$

where the relevant CPM parameters have been described above. This waveform is sampled at rate N/T to yield the complex length KN vector of signal samples $$s^p = (s_0^p, \ldots, s_{KN-1}^p)^T \quad (10)$$

$$s_n^p = s^p(nT_s;x)$$

$$= \exp(j\theta_{k-L}^p)\exp\left(j2\pi h\sum_{i=0}^{L-1} x_{k-i}^p q(nT/N+(k-i)T)\right)$$

$$T_s = T/N; n=0,\ldots,KN-1; k=\lfloor n/N \rfloor; k=0,\ldots,K-1$$

Here, $\lfloor \cdot \rfloor$ denote the flooring function.

In order to construct the uplink waveform, the DFT of the vector $s^p$ is first taken. This operation yields the length KN vector $S^p$ whose elements are defined as follows $$S_k^p = \sum_{n=0}^{KN-1} s_n^p e^{-j2\pi kn/KN} \quad (11)$$

$$k=0,\ldots,KN-1$$

Next, in order to accommodate multiple access usage, this vector of DFT coefficients is zero-padded to a length PKN sequence, $$D_{k'}^p = \begin{cases} S_k^p & k' = kP+p \\ 0 & \text{otherwise} \end{cases} \quad (12)$$

The uplink waveform which is associated with the pth user is then the KNP point inverse DFT of $\{D_k^p: D_0^p, \ldots, D_{KNP-1}^p\}$.

Equation (14) is actually an interleaved FDMA (IFDMA) is a mapping scheme whereby the output of the DFT are inserted in regular intervals into the IFFT.

Without loss of generality, we assume that p=0 (user 0) and make the following example proof. The extension of this proof to the case in which p≠0 is trivial.

When the subcarrier mapping scheme is IFDMA, then the subcarrier mapping can be expressed as follows $$D_{k'}^0 = \begin{cases} S_{k'/P}^0 & k' = Pk \quad (0 \le k \le KN-1) \\ 0, & \text{otherwise} \end{cases} \quad (13)$$

The inverse DFT of the mapped frequency-domain samples $\{D_k^0\}$ yields the time-domain symbols. $d_m^0$. Let m=(KN)q+n, where $0 \le q \le P-1$ and $0 \le n \le KN-1$. Then, it follows that $$d_m^0 = \frac{1}{KNP}\sum_{k'=0}^{KNP-1} D_{k'}^0 e^{j2\pi \frac{m}{KNP}k'} \quad (14)$$

$$= \frac{1}{P}\cdot\frac{1}{KN}\sum_{k=0}^{KN-1} S_k^0 e^{j2\pi \frac{m}{KN}k}$$

$$= \frac{1}{P}\cdot\frac{1}{KN}\sum_{k=0}^{KN-1} S_k^0 e^{j2\pi \frac{KNq+n}{KN}k}$$

$$= \frac{1}{P}\cdot\frac{1}{KN}\sum_{k=0}^{KN-1} S_k^0 e^{j2\pi \frac{n}{KN}k}$$

$$= \frac{1}{P}s_n^0$$

Hence, from the definition of the index m, it follows that $$d_m^0 = s_{KNq+n}^0 = \frac{1}{P}s_n^0 \quad (15)$$

$$d_{KN\cdot 0+n}^0 = d_{KN\cdot 1+n}^0 = \ldots = d_{KN\cdot(P-1)+n}^0 = \frac{1}{P}s_n^0$$

$$0 \le n \le KN-1$$

The relation in (17) implies the resulting uplink sequence, $d_m^0$ is an amplitude-scaled repetition of the original symbols, $s_n^0$ Consequently, the PAPR remains unchanged from the original samples:

$$PAPR = \frac{\max_{m=0,\ldots,KNP-1} |d_m^0|^2}{\frac{1}{KNP}\sum_{m=0}^{KNP-1} |d_m^0|^2} \quad (16)$$

$$= \frac{\max_{n=0,\ldots,KNP-1} |d_m^0|^2}{\frac{1}{KNP}\sum_{n=0}^{KNP-1} |d_m^0|^2}.$$

Since the signal samples are merely amplitude-scaled repetition of the original constant envelope samples, $s_n^0$, it is straightforward to show that $$PAPR = \frac{\max_{n=0,\ldots,KN-1} |s_n^0|^2}{\frac{1}{KN}\sum_{n=0}^{KN-1} |s_n^0|^2} = 1 \qquad (17)$$

$$PAPR_{dB} = 0$$

A similar proof of (19) exists for $p \neq 0$ (i.e., for the other users).

Hence, in an example embodiment, the uplink waveform has 0 dB PAPR regardless of the modulation level and regardless of the number of sub-carriers (KN) being used.

The techniques described herein may have a number of advantages, such as, for example:

(1) Unlike methods like companding, this invention maintains subcarrier orthogonality.

(2) This technique may generate a waveform having 0 dB PAPR, which is ideal for uplink transmissions wherein battery life is of concern.

(3) This technique provides a method whereby the CPM modulation may be equalized using techniques that have been developed for linear modulation schemes. This represents a very important advance for CPM.

(4) The use of CPM may provide a more robust transmission environment since the CPM modulation parameters may be selected in order to achieve a certain BER performance. This is accomplished by the judicious selection of the modulation parameters, M, h, L and the phase shaping function. However, these additional degrees of freedom are not typically present with linear modulation schemes.

Figure 7:
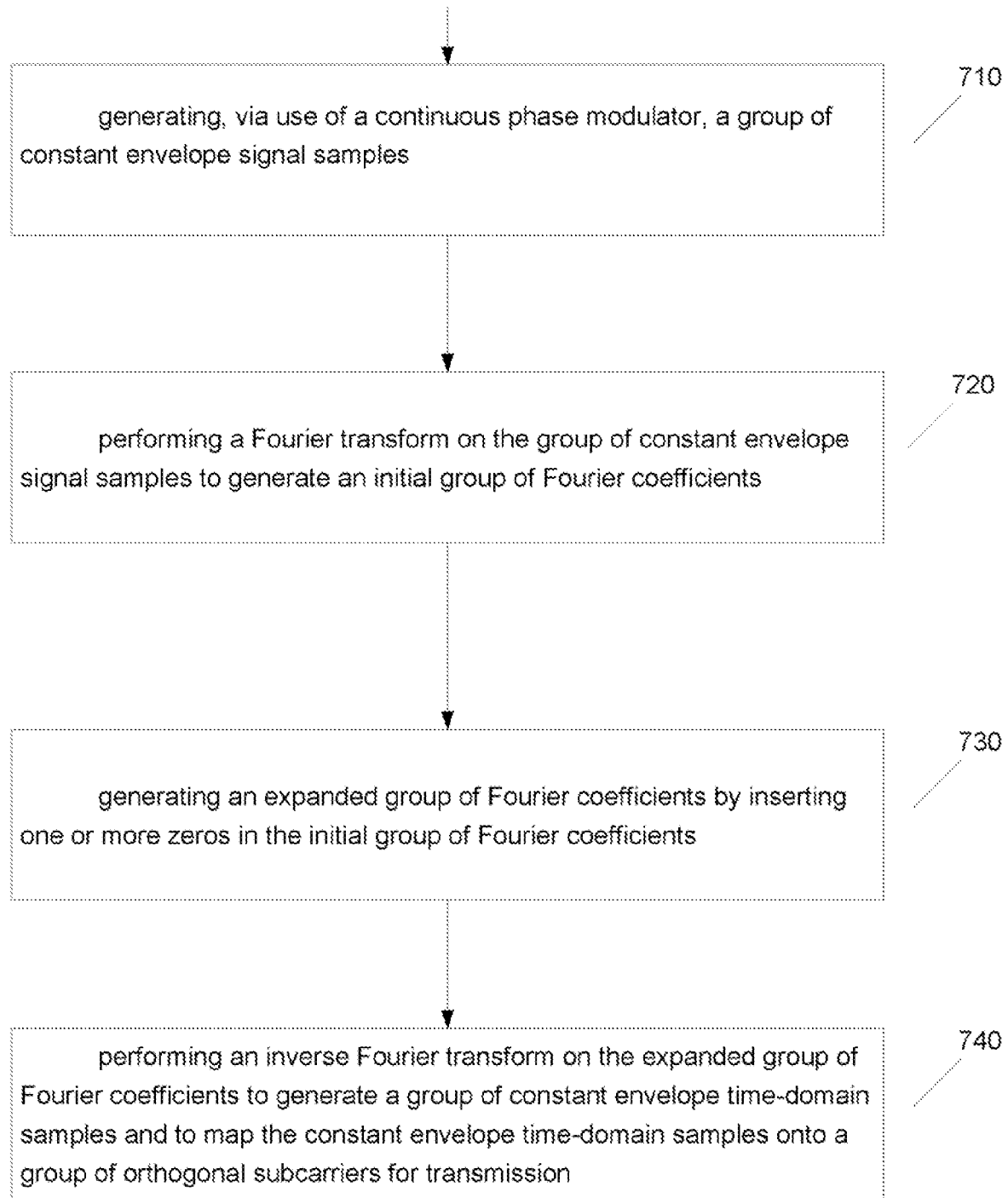
FIG. 7 is a flow chart illustrating operation of a wireless node according to an example embodiment.

FIG. 7 is a flow chart illustrating operation of a system according to an example embodiment. Block 710 may include generating, via use of a continuous phase modulator, a group of constant envelope signal samples. Block 720 may include performing a Fourier transform on the group of constant envelope signal samples to generate an initial group of Fourier coefficients. Block 730 may include generating an expanded group of Fourier coefficients by inserting one or more zeros in the initial group of Fourier coefficients. And, block 740 may include performing an inverse Fourier transform on the expanded group of Fourier coefficients to generate a group of constant envelope time-domain samples and to map the constant envelope time-domain samples onto a group of orthogonal subcarriers for transmission.

In an example embodiment, block 710 may include modulating, via a continuous phase modulator, a group of symbols to output a constant envelope signal; and sampling the constant envelope signal to generate a group of constant envelope signal samples.

In an example embodiment, block 710 may include mapping a group of bits to a group of symbols; modulating, via a continuous phase modulator, the group of symbols to output a constant envelope signal; and sampling the constant envelope signal to generate a group of constant envelope signal samples.

In an example embodiment block 720 may include performing a Discrete Fourier Transform (DFT) on the group of constant envelope signal samples to generate an initial group of Fourier coefficients.

In an example embodiment, block 730 may include inserting one or more zeros in the initial group of Fourier coefficients, a location and number of zeros inserted being based on a current user and a number of users in a multiuser wireless system.

In an example embodiment, block 730 may include inserting one or more zeros in the initial group of Fourier coefficients at locations associated with resources or subcarriers used by or assigned to other users of a multiuser wireless system.

In another example embodiment, block 730 may include inserting P–1 zeros between consecutive Fourier coefficients of the initial group of Fourier coefficients, where P is a number of users.

In yet another example embodiment, block 730 may include inserting P–1 zeros between consecutive Fourier coefficients of the initial group of Fourier coefficients, where P is a number of users; inserting p zeros before the first Fourier coefficient of the initial group of Fourier coefficients, where p identifies a current user; and inserting P–1-p zeros after a last Fourier coefficient of the initial group of Fourier coefficients.

In an example embodiment, block 740 may include performing an inverse Discrete Fourier transform on the expanded group of Fourier coefficients to generate a group of constant envelope time-domain samples and to map the constant envelope time-domain samples onto a group of orthogonal subcarriers for transmission.

In another example embodiment, block 740 may include performing an inverse Discrete Fourier transform on the expanded group of Fourier coefficients to generate a group of constant envelope time-domain samples and to map the constant envelope time-domain samples onto a group of Orthogonal Frequency Division Multiple Access (OFDMA) subcarriers for transmission.

According to another example embodiment, an apparatus for use in a wireless transmitter may include a continuous phase modulation (CPM) sample generator configured to generate a group of constant envelope CPM modulated signal samples, a Fourier transform block configured to perform a Fourier transform on the group of constant envelope signal samples to generate an initial group of Fourier coefficients, a zero insertion block configured to generate an expanded group of Fourier coefficients by inserting one or more zeros in the initial group of Fourier coefficients, and an inverse Fourier transform block configured to perform an inverse Fourier transform on the expanded group of Fourier coefficients to generate a group of constant, envelope time-domain samples and to map the constant envelope time-domain samples onto a group of orthogonal subcarriers for transmission. In example embodiment, the CPM sample generator may include, e.g., either 1) a continuous phase modulation (CPM) modulator configured to perform continuous phase modulation on a set of symbols, and a sampler configured to sample an output of the CPM modulator to generate a group of constant envelope signal samples; or 2) a memory (e.g., Read Only Memory or ROM) configured (e.g., storing a lookup table and storing CPM signal samples) to store CPM signal samples, and to output one of a plurality of the CPM signal samples. These are merely some example embodiments, and other embodiments of the CPM sample generator may be used.

According to another example embodiment, a method may include generating a group of constant envelope continuous phase modulation (CPM) modulated signal samples, performing a Fourier transform on the group of constant envelope signal samples to generate an initial group of Fourier coefficients, generating an expanded group of Fourier coefficients by inserting one or more zeros in the initial group of Fourier coefficients, performing an inverse Fourier transform on the expanded group of Fourier coefficients to generate a group of constant envelope time-domain samples and to map the constant envelope time-domain samples onto a group of orthogonal subcarriers for transmission.

Figure 8:
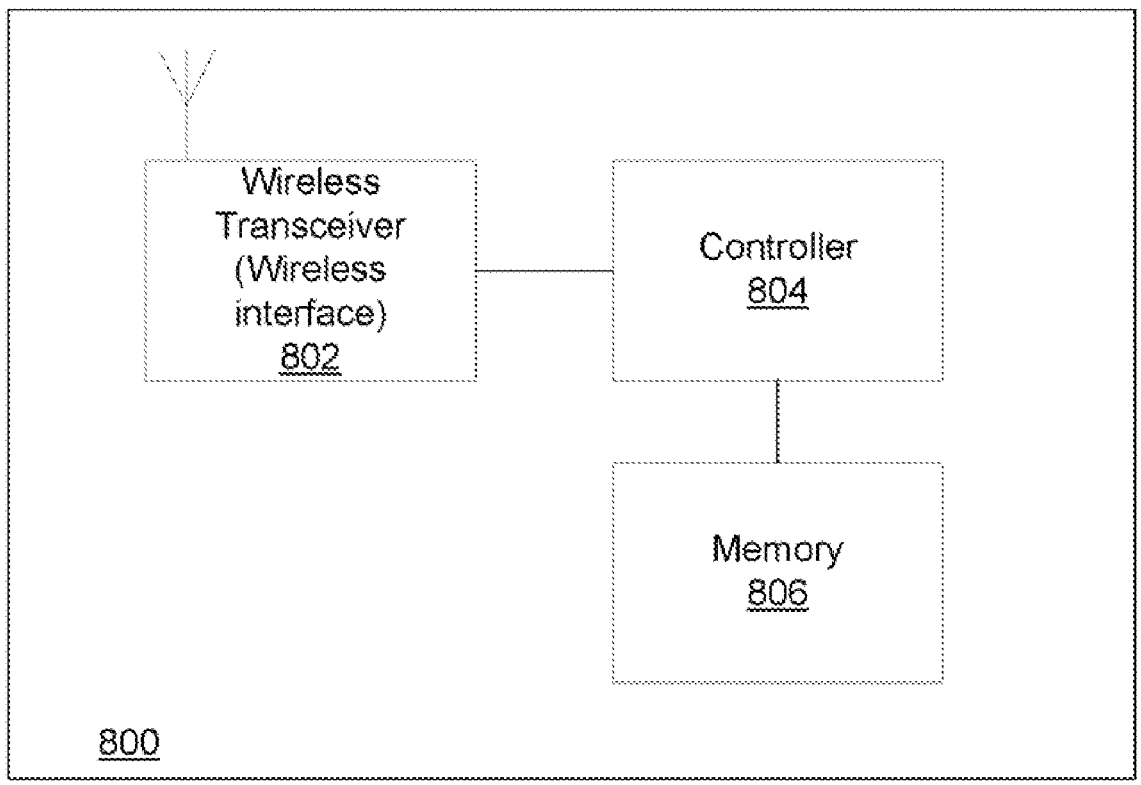
FIG. 8 is a block diagram of a wireless node according to an example embodiment.

FIG. 8 is a block diagram of a wireless node according to an example embodiment. The wireless node 800 may include a wireless transceiver 802, and a controller 804, and a memory 806. A wireless transmitter 210 may include transceiver 802 and/or controller 804. For example, some operations illustrated in FIG. 2 may be performed by a controller 804, under control of software or firmware, for example.

In addition, a storage medium may be provided that includes stored instructions, which when executed by a controller or processor may result in a controller, or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program (s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal bard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

CCDF: Complementary Cumulative Distribution Function
OFDM: Orthogonal Frequency Division Multiplexing
OFDMA: Orthogonal Frequency Division Multiple Access
IFDMA: Interleaved Frequency Division Multiple Access
LFDMA: Localized Frequency Division Multiple Access
CPM: Continuous Phase Modulation
PAPR: Peak-to-Average-Power Ratio
3GPP: Third Generation Partnership Project
LTE: Long Term Evolution
WiMAX: Worldwide Interoperability for Microwave Access While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   generating, by a processor, via use of a continuous phase modulator, a group of constant envelope signal samples;
   converting the group of constant envelope signal samples from a serial protocol to a parallel protocol;
   performing a Fourier transform on the converted group of constant envelope signal samples to generate an initial group of Fourier coefficients;
   generating an expanded group of Fourier coefficients by inserting one or more zeros in the initial group of Fourier coefficients; and
   performing an inverse Fourier transform on the expanded group of Fourier coefficients to generate a group of constant envelope time-domain samples and to map the constant envelope time-domain samples onto a group of orthogonal subcarriers for transmission.

2. The method of claim 1 wherein the generating, via use of a continuous phase modulator, a group of constant envelope signal samples comprises:
   modulating, via a continuous phase modulator, a group of symbols to output a constant envelope signal; and
   sampling the constant envelope signal to generate a group of constant envelope signal samples.

3. The method of claim 1 wherein the generating, via use of a continuous phase modulator, a group of constant envelope signal samples comprises:
   mapping a group of bits to a group of symbols;
   modulating, via a continuous phase modulator, the group of symbols to output a constant envelope signal; and
   sampling the constant envelope signal to generate a group of constant envelope signal samples.

4. The method of claim 1 wherein the performing a Fourier transform comprises performing a Discrete Fourier Transform (DFT) on the group of constant envelope signal samples to generate an initial group of Fourier coefficients.

5. The method of claim 1 wherein the generating an expanded group of Fourier coefficients comprises inserting one or more zeros in the initial group of Fourier coefficients, a location and number of zeros inserted being based on a current user and a number of users in a multiuser wireless system.

6. The method of claim 1 wherein the generating an expanded group of Fourier coefficients comprises inserting one or more zeros in the initial group of Fourier coefficients at locations associated with resources or subcarriers used by or assigned to other users of a multiuser wireless system.

7. The method of claim 1 wherein the generating an expanded group of Fourier coefficients comprises:
   inserting P−1 zeros between consecutive Fourier coefficients of the initial group of Fourier coefficients, where P is a number of users.

8. The method of claim 1 wherein the generating an expanded group of Fourier coefficients comprises:
   inserting P−1 zeros between consecutive Fourier coefficients of the initial group of Fourier coefficients, where P is a number of users;
   inserting p zeros before the first Fourier coefficient of the initial group of Fourier coefficients, where p identifies a current user; and
   inserting P−1−p zeros after a last Fourier coefficient of the initial group of Fourier coefficients, where p=0, . . . , P−1.

9. The method of claim 1 wherein the performing an inverse Fourier transform on the expanded group of Fourier coefficients comprises performing an inverse Discrete Fourier transform on the expanded group of Fourier coefficients to generate a group of constant envelope time-domain samples and to map the constant envelope time-domain samples onto a group of orthogonal subcarriers for transmission.

10. The method of claim 1 wherein the performing an inverse Fourier transform on the expanded group of Fourier coefficients comprises performing an inverse Discrete Fourier transform on the expanded group of Fourier coefficients to generate a group of constant envelope time-domain samples and to map the constant envelope time-domain samples onto a group of Orthogonal Frequency Division Multiple Access (OFDMA) subcarriers for transmission.

11. An apparatus for use in a wireless transmitter, the apparatus comprising:
   a continuous phase modulation (CPM) sample generator configured to generate a group of constant envelope CPM modulated signal samples;
   a Fourier transform block configured to perform a Fourier transform on the group of constant envelope signal samples to generate an initial group of Fourier coefficients;
   a zero insertion block configured to generate an expanded group of Fourier coefficients by inserting one or more zeros in the initial group of Fourier coefficients;
   an inverse Fourier transform block configured to perform an inverse Fourier transform on the expanded group of Fourier coefficients to generate a group of constant envelope time-domain samples and to map the constant envelope time-domain samples onto a group of orthogonal subcarriers for transmission; and
   a serial to parallel (S/P) converter coupled between the continuous phase modulation (CPM) sample generator and the Fourier transform block.

12. The apparatus of claim 11 wherein the CPM sample generator comprises:
   a continuous phase modulation (CPM) modulator configured to perform continuous phase modulation on a set of symbols;
   a sampler configured to sample an output of the CPM modulator to generate the group of constant envelope signal samples.

13. The apparatus of claim 11 wherein the CPM sample generator comprises:
   a memory configured to store CPM signal samples, and to output one of a plurality of the CPM signal samples.

14. The apparatus of claim 11 wherein the CPM sample generator comprises:
   a CPM sample ROM configured to store CPM signal samples, and to output one of a plurality of the CPM signal samples.

15. The apparatus of claim 11 wherein the Fourier transform block comprises a discrete Fourier transform block.

16. The apparatus of claim 11 wherein the inverse Fourier transform block comprises an inverse discrete Fourier transform block.

17. The apparatus of claim 11 wherein the zero insertion block comprises a zero insertion block configured to generate an expanded group of Fourier coefficients by inserting one or more zeros in the initial group of Fourier coefficients at locations associated with resources or subcarriers used by or assigned to other users of a multiuser wireless system.

18. The apparatus of claim 11 wherein the zero insertion block comprises a zero insertion block configured to generate an expanded group of Fourier coefficients by inserting P−1 zeros between consecutive Fourier coefficients of the initial group of Fourier coefficients, where P is a number of users.

19. The apparatus of claim 11 wherein the zero insertion block comprises a zero insertion block configured to generate an expanded group of Fourier coefficients by:
   inserting P−1 zeros between consecutive Fourier coefficients of the initial group of Fourier coefficients, where P is a number of users;
   inserting p zeros before the first Fourier coefficient of the initial group of Fourier coefficients, where p identifies a current user; and
   inserting P−1−p zeros after a last Fourier coefficient of the initial group of Fourier coefficients.

20. A method comprising:
   generating, by a processor, a group of constant envelope continuous phase modulation (CPM) modulated signal samples;
   converting the group of CPM modulated signal samples from a serial protocol to a parallel protocol;
   performing a Fourier transform on the converted group of constant envelope signal samples to generate an initial group of Fourier coefficients;
   generating an expanded group of Fourier coefficients by inserting one or more zeros in the initial group of Fourier coefficients;
   performing an inverse Fourier transform on the expanded group of Fourier coefficients to generate a group of constant envelope time-domain samples and to map the constant envelope time-domain samples onto a group of orthogonal subcarriers for transmission.

21. The method of claim 20 wherein the generating an expanded group of Fourier coefficients comprises:

inserting P−1 zeros between consecutive Fourier coefficients of the initial group of Fourier coefficients, where P is a number of users.

22. The method of claim 20 wherein the generating an expanded group of Fourier coefficients comprises:
   inserting P−1 zeros between consecutive Fourier coefficients of the initial group of Fourier coefficients, where P is a number of users;
   inserting p zeros before the first Fourier coefficient of the initial group of Fourier coefficients, where p identifies a current user; and
   inserting P−1−p zeros after a last Fourier coefficient of the initial group of Fourier coefficients, where p=0, . . . , P−1.

23. The method of claim 20 wherein the performing an inverse Fourier transform on the expanded group of Fourier coefficients comprises performing an inverse Discrete Fourier transform on the expanded group of Fourier coefficients to generate a group of constant envelope time-domain samples and to map the constant envelope time-domain samples onto a group of orthogonal subcarriers for transmission.

24. The method of claim 20 wherein the performing an inverse Fourier transform on the expanded group of Fourier coefficients comprises performing an inverse Discrete Fourier transform on the expanded group of Fourier coefficients to generate a group of constant envelope time-domain samples and to map the constant envelope time-domain samples onto a group of Orthogonal Frequency Division Multiple Access (OFDMA) subcarriers for transmission.

25. The method of claim 20, wherein the generating a group of constant envelope CPM signal samples comprises:
   modulating, via a continuous phase modulator, a group of symbols to output a constant envelope signal; and
   sampling the constant envelope signal to generate a group of constant envelope signal samples.

* * * * *